(12) United States Patent
Goodhue

(10) Patent No.: US 6,572,725 B2
(45) Date of Patent: Jun. 3, 2003

(54) METHOD FOR FABRICATING HONEYCOMB MATERIAL

(75) Inventor: William Velte Goodhue, North Kingstown, RI (US)

(73) Assignee: Hunter Douglas Inc., Upper Saddle River, NJ (US)

(*) Notice: Subject to any disclaimer, the term of this patent is extended or adjusted under 35 U.S.C. 154(b) by 0 days.

(21) Appl. No.: 10/029,163

(22) Filed: Dec. 19, 2001

(65) Prior Publication Data

US 2002/0092620 A1 Jul. 18, 2002

Related U.S. Application Data

(63) Continuation of application No. 09/902,511, filed on Jul. 9, 2001, now abandoned, which is a continuation of application No. 09/015,017, filed on Jan. 28, 1998, now abandoned, which is a continuation of application No. 08/030,829, filed on Mar. 12, 1993, now Pat. No. 5,714,034, which is a division of application No. 07/929,473, filed on Aug. 14, 1992, now Pat. No. 5,228,936, which is a continuation of application No. 07/578,548, filed on Sep. 6, 1990, now abandoned.

(51) Int. Cl.[7] .............................................. B32B 31/18
(52) U.S. Cl. ..................... 156/256; 156/60; 156/197; 156/250; 156/259; 156/290; 156/291
(58) Field of Search ......................... 156/60, 196, 197, 156/250, 256, 259, 290, 291; 210/260

(56) References Cited

U.S. PATENT DOCUMENTS

| 1,937,342 A | 8/1933 | Higbie |
| 2,029,675 A | 2/1936 | Schlamp |
| 2,110,145 A | 3/1938 | Loehr |
| 2,140,049 A | 12/1938 | Grauel |
| 2,267,869 A | 12/1941 | Loehr |
| 2,688,356 A | 9/1954 | Conti |
| 2,822,840 A | 2/1958 | Reynolds et al. |
| 2,865,446 A | 8/1958 | Cole |
| 2,914,122 A | 11/1959 | Pinto |
| 3,143,454 A | 8/1964 | Hannon |
| 3,384,519 A | 5/1968 | Froget |
| 3,441,463 A | 4/1969 | Buck |
| 3,660,195 A | 5/1972 | Hoyt |
| 3,661,665 A | 5/1972 | Froget |
| 3,701,376 A | 10/1972 | Froget |
| 3,713,954 A | 1/1973 | Clark et al. |
| 4,019,554 A | 4/1977 | Rasmussen |
| 4,039,019 A | 8/1977 | Hopper |
| 4,194,550 A | 3/1980 | Hopper |
| RE30,254 E | 4/1980 | Rasmussen |
| 4,344,474 A | 8/1982 | Berman |
| 4,386,454 A | 6/1983 | Hopper |
| 4,450,027 A | 5/1984 | Colson |
| 4,732,630 A | 3/1988 | Schnebly |
| 4,849,039 A | 7/1989 | Colson et al. |
| 4,885,190 A | 12/1989 | Schnebly |

FOREIGN PATENT DOCUMENTS

| AU | 249985 | 5/1960 |
| CH | 331432 | 7/1958 |
| CH | 476482 | 8/1969 |

(List continued on next page.)

Primary Examiner—David A. Reifsnyder
(74) Attorney, Agent, or Firm—Dorsey & Whitney LLP

(57) ABSTRACT

An apparatus for making expandable honeycomb structures suitable for use as window coverings. In one embodiment, folded tubular strips with adhesive lines are fed continuously through a cutter which cuts them into predetermined lengths. The cut strips are then accelerated to a stacker for further processing before the next cut strip arrives. In another embodiment, webs of material are fed continuously in a downstream direction, adhesive lines are applied, a middle web is slitted into strips, and the strips bonded along opposite edges to the outer webs. By choosing for the outer webs transparent or porous material, and for the middle web opaque material, a light or air controlling honeycomb structure results.

17 Claims, 6 Drawing Sheets

FOREIGN PATENT DOCUMENTS

| | | |
|---|---|---|
| CH | 494338 | 7/1970 |
| DE | 382758 | 5/1922 |
| DE | 684202 | 1/1939 |
| DE | 1241361 | 7/1964 |
| DE | 1942674 | 8/1969 |
| DE | 7008554 | 10/1971 |
| DE | 2735654 | 2/1979 |
| DE | 2923233 | 6/1979 |
| DE | 2936811 | 4/1981 |
| DE | 3525515 | 1/1987 |
| EP | 29442 | 11/1984 |
| EP | 243008 | 11/1991 |
| FR | 1166398 | 2/1957 |
| FR | 1364674 | 3/1962 |
| FR | 1309194 | 10/1962 |
| FR | 1373515 | 8/1964 |
| FR | 1465261 | 1/1966 |
| FR | 1480262 | 3/1966 |
| FR | 1526507 | 6/1967 |
| FR | 1585159 | 1/1970 |
| FR | 2398170 | 2/1979 |
| GB | 951484 | 3/1964 |
| GB | 1116934 | 1/1965 |
| GB | 1036126 | 7/1966 |
| GB | 1228677 | 4/1971 |
| GB | 1308296 | 2/1973 |
| NL | 7805464 | 5/1978 |
| WO | 8002712 | 12/1980 |

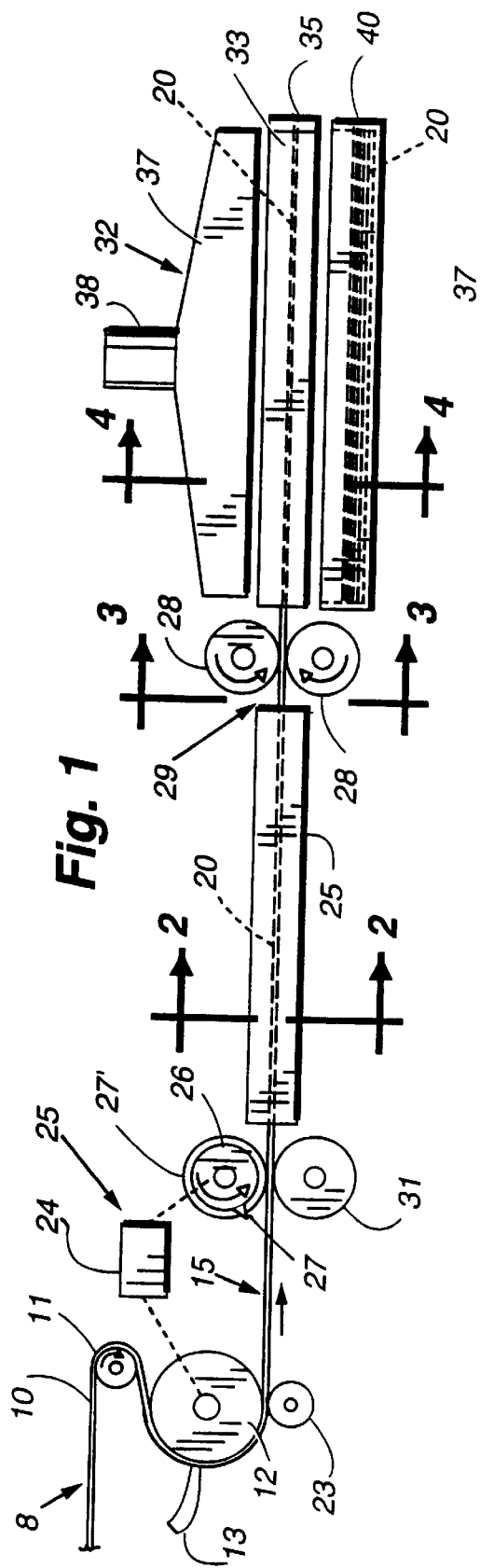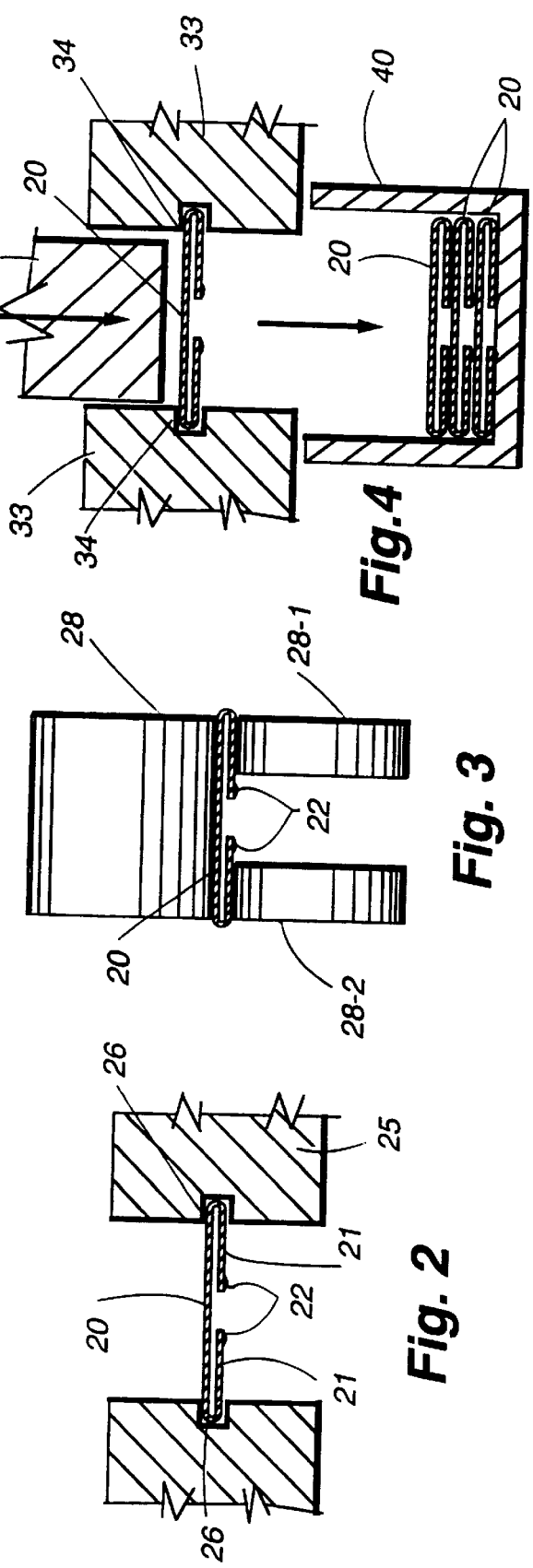

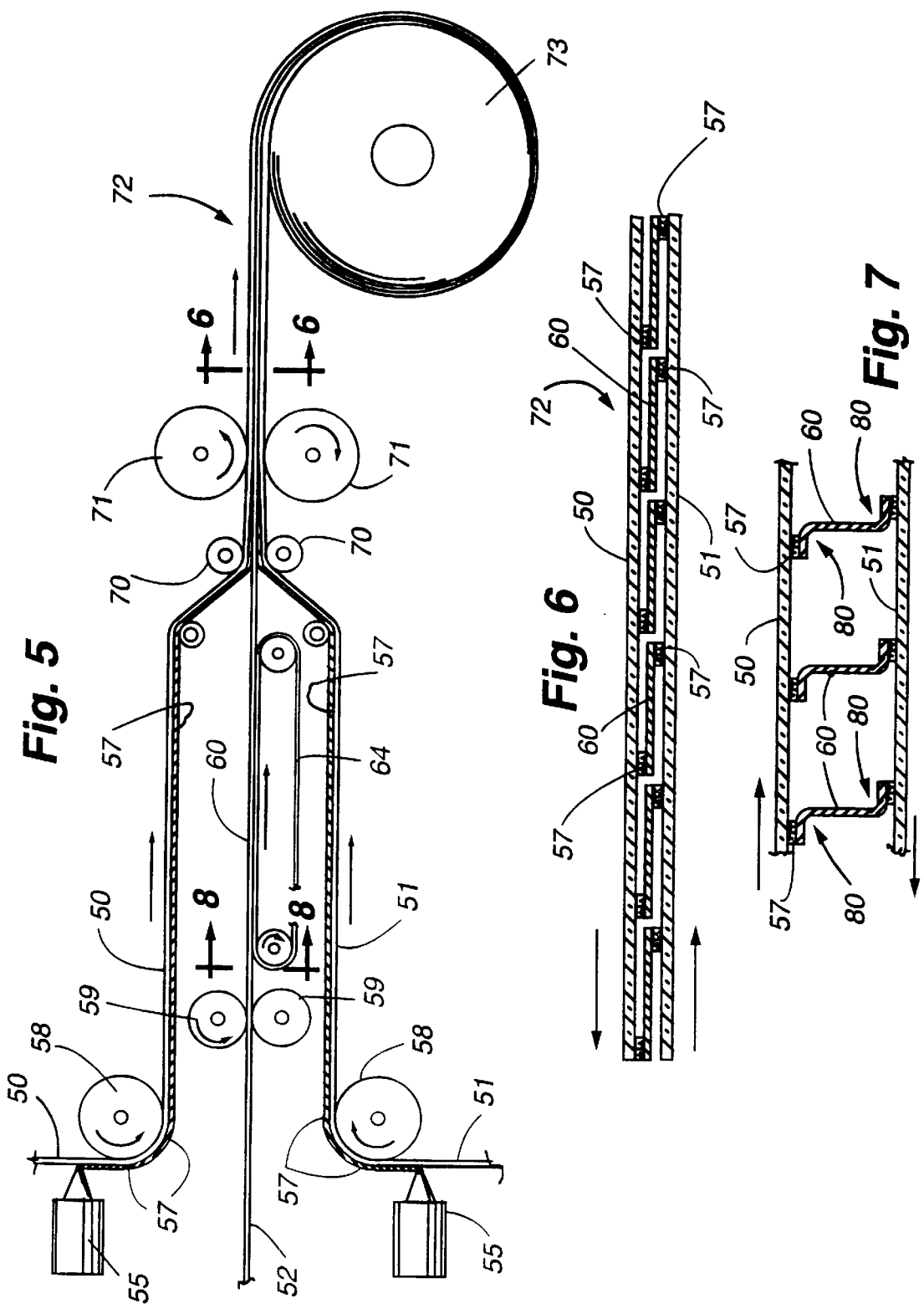

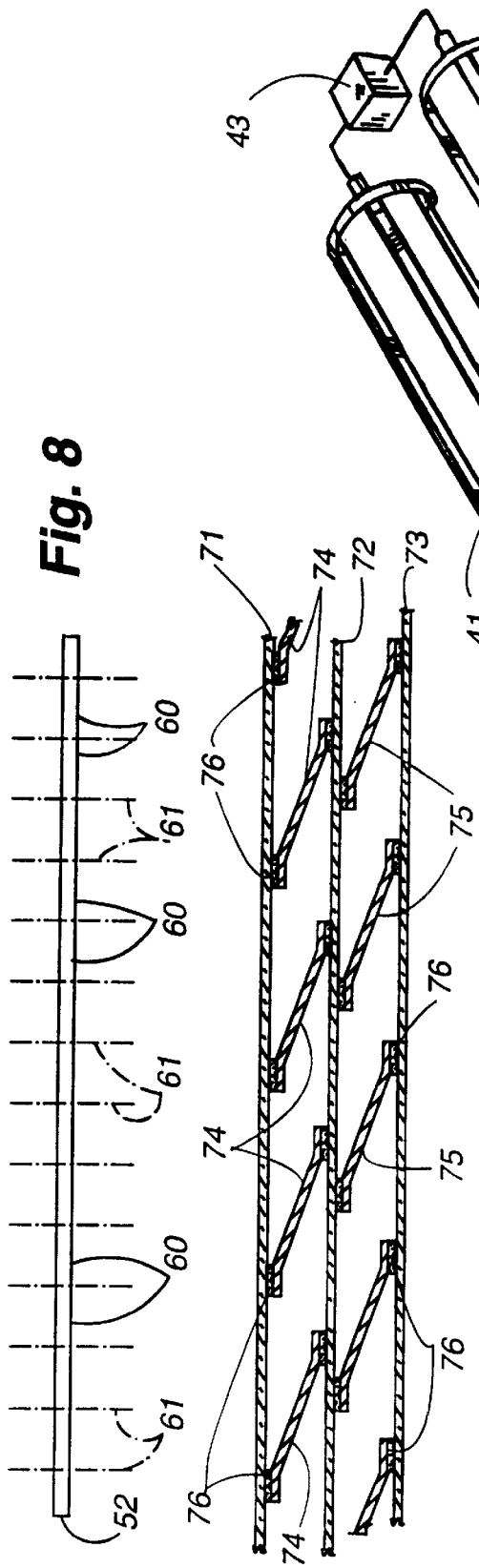
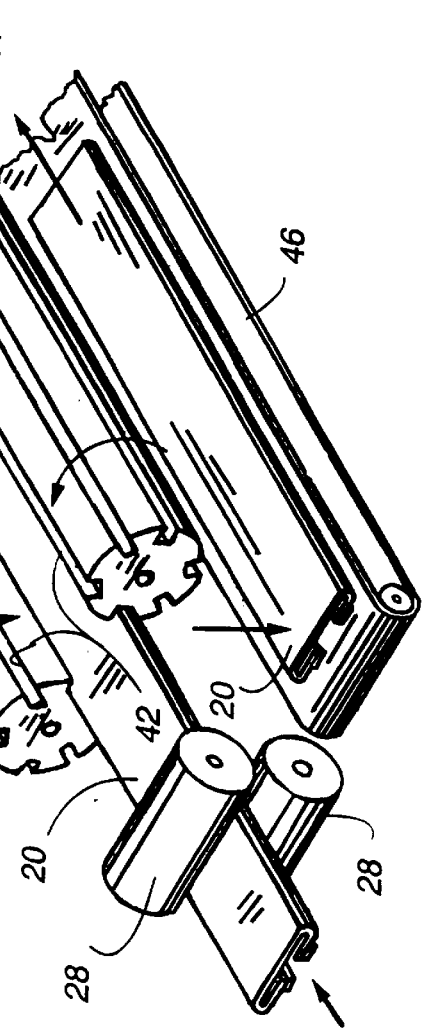

METHOD FOR FABRICATING HONEYCOMB MATERIAL

CROSS REFERENCE TO RELATED APPLICATIONS

This application is a continuation of U.S. application Ser. No. 09/902,511, filed Jul. 9, 2001, now abandoned, which is a continuation of U.S. application Ser. No. 09/015,017, filed Jan. 28, 1998, now abandoned, which is continuation of U.S. application Ser. No. 08/030,829, filed Mar. 12, 1993, now U.S. Pat. No. 5,714,034, which is a division of U.S. application Ser. No. 07/929,473, filed Aug. 14, 1992, now U.S. Pat. No. 5,228,936, which is a continuation of U.S. application Ser. No. 07/578,548, filed Sep. 6, 1990, now abandoned. The U.S. application Ser. Nos. '548, '473, '829, '017, and '511 are hereby incorporated by reference as though fully set forth herein.

FIELD OF INVENTION

This invention relates to a process and apparatus for fabricating honeycomb material.

BACKGROUND OF INVENTION

Commonly-assigned U.S. Pat. No. 4,885,190 describes a process and machine for making expandable honeycomb material, the contents of which patent are hereby incorporated by reference. The underlying concept is to feed a strip of material from a continuous supply, apply lines of adhesive to the material, cut the strips into desired widths, fold the strips into flat tubular form, and then wind the tubular strips on an annular rack. The adhesive lines are located such that those on top of each tube are located below the bottom of the superposed tube. The resultant assembly of tubes after further processing is heated to activate or soften the glue and compressed to cause the stacked tubes to permanently adhere to one another. With the provision of suitable creases and pleats, an expandable honeycomb structure results of a type that has proved very popular with the public as a window covering. U.S. Pat. Nos. 4,450,027 and 4,849,039 describe other ways of making a similar structure. One aspect of the present invention is to provide an alternative method and apparatus that offers certain advantages.

The honeycomb structure described above offers a window covering with insulating properties if the material used will block or attenuate air flow. If the material is transparent, it will allow light passage; if opaque, it will block light. But the resultant structure cannot control the passage of light in the same sense that a conventional venetian blind allows a user by tilting the slats to control the passage of light through a window into a room.

U.S. Pat. No. 3,384,519 describes a honeycomb structure that is capable of controlling the light passing through. It is made up of transparent cloth sheets interconnected by cloth strips functioning as slats. By making the cloth strips opaque, light will be blocked in one position of the cloth sheets when the strips lie flat and abut or overlap, and light can pass in another position of the cloth sheets when the strips extend in parallel planes. However, the method and apparatus described in this patent for making this structure have certain disadvantages. Another aspect of the present invention provides an alternative method and apparatus that provides certain advantages.

SUMMARY OF INVENTION

An object of the invention is a novel apparatus for the fabrication of expandable honeycomb structures of the type comprising superposed adhered tubular strips.

Another object of the invention is a novel process and apparatus for the fabrication of expandable honeycomb structures of the type comprising opposed material sheets interconnected by material strips.

A further object is a honeycomb structure and apparatus for making it that is relatively simple and capable of low cost manufacture.

In accordance with a first aspect of the invention, a continuous pre-creased and tubularly-folded strip is passed through an adhesive applicator to form two adhesive lines along the opposed edges of the folded tube. This intermediate product is then processed through a synchronous shearing device or cutter which severs the continuous folded tube into predetermined lengths, which then enter the nip of a strip feeder operating at a much higher speed. The cut tubes are thus accelerated into a stacker, in which they are then pushed or dropped individually down through a bottom opening into a holder, with each next the being stacked on top of the previous tube, or the tubes conveyed away for downstream stacking. The resultant stack of tubes can then be processed as in the referenced patents, by activating the adhesive lines to cause the tubes to adhere to one another to form a unitary structure especially suited for use as a window covering. Alternatively, the conveyed strips can be cut to size, stacked, and adhered to form the unitary structure.

A feature of this aspect of the invention is to accelerate the cut tube to the stacker. This allows the time needed for the tube to reach its final stacking position and be discharged before the next tube arrives. As a result, the processing of the continuous strip can be uninterrupted, and a higher production rate of the finished product is possible.

In accordance with a second aspect of the invention, at least two webs or sheets of material are continuously fed in a downstream direction. These first and second webs will serve as the outer sheets of a honeycomb construction of a type capable of controlling light or air. A middle or third web is provided which can be slit into multiple strips which continue to feed together with the first and second webs in a downstream direction. Lines of adhesive are applied to the webs or to the strips. The adhesive lines are located such that corresponding outer edges of each strip can be respectively adhered to the first and second webs. When the adhesive lines are activated and the webs with intervening strips compressed, a honeycomb structure results that, with opaque strips and transparent outer webs, is capable of controlling the passage of light or air.

A feature of this aspect of the invention is that a surprising number of different structures can be produced with only minor changes in the processing. Some of these structures are especially suited for use as window coverings.

In accordance with a third aspect of the invention, by means of a process which is a variation of that described in connection with the second aspect of the invention, a honeycomb structure results that is not foldable or expandable and that is useful as a low-weight, low-cost insulating barrier. In particular, which the proper location of the strips between the webs, and the provision of additional webs, the resulting sub-assembly when opened presents an array of hexagonal cells. By slitting this sub-assembly into narrow sections, and then bonding material sheets on opposite sides of the open ended cells, the cells are closed forming a reasonably good barrier to the flow of heat. This application will have other uses besides window coverings.

Other objects and advantages of the invention will be apparent from the detailed description that follows of several embodiments in accordance with the different aspects of this invention, which should be taken in conjunction with the accompanying drawings.

SUMMARY OF DRAWINGS

In the drawings:

FIG. 1 is a schematic side view of one form of apparatus in accordance with a first aspect of the present invention;

FIG. 2 is a cross-sectional view along the line 2—2 of FIG. 1;

FIG. 3 is a cross-sectional view along the line 3—3 of FIG. 1;

FIG. 4 is a cross-sectional view along the line 4—4 of FIG. 1;

FIG. 4A is a perspective view of a modified form of cut strip handler;

FIG. 5 is a schematic side view of one form of apparatus in accordance with a second aspect of the present invention;

FIG. 6 is a somewhat schematic cross-sectional view of the end product formed by the apparatus of FIG. 5;

FIG. 7 is a view of the end product of FIG. 6 shown in its expanded position;

FIG. 8 is an end view of the middle web of FIG. 5 showing the slitting lines;

FIG. 9 is a cross-sectional view similar to FIG. 7 showing a modification;

DETAILED DESCRIPTION OF PREFERRED EMBODIMENTS

Figure 1A:
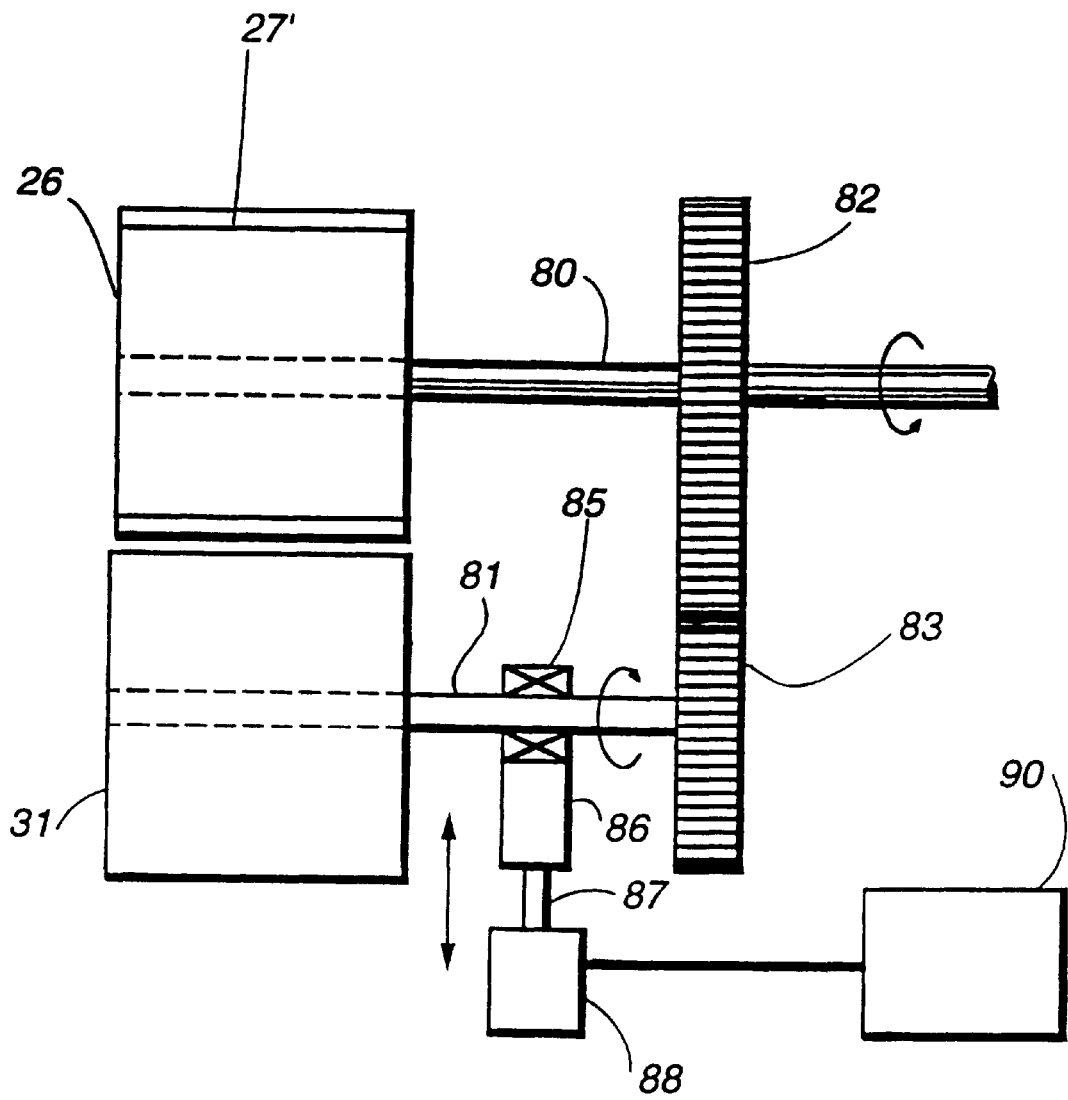
FIG. 1A is a detail view of the strip cutter of the apparatus of FIG. 1.

FIGS. 1–4 illustrate an apparatus in accordance with a first aspect of this invention to fabricate a honeycomb structure of the type described in the above-referenced U.S., Pat. Nos. 4,450,027; 4,849,039; and 4,885,120. The starting point for the present invention, indicated at the arrow 8, is a precreased and prefolded flat tubular strip of material 10. It would be in a form corresponding to that stage of the processing in (a) U.S. Pat. No. 4,450,027, between the crimper 80 and the adhesive applicator 120, or after the adhesive applicator 120, or in (b) U.S. Pat. No. 4,849,039, before the adhesive applicator, or in (c) U.S. Pat. No. 4,885,190, between the drive wheel 108 and the stacker 120. While it i[] preferred that the adhesive lines not be applied to the strip until after it has been creased and folded into the desired tubular form, this is not essential to the present invention, and the adhesive lines, if desired, can be provided earlier in the processing, as described in U.S. Pat. No. 4,885,190. The '190 patent also discloses heat resistant copolyester adhesive that may be used with the present invention. Namely, the strips may be bonded to the webs using extruded copolyester strips as disclosed in the '190 patent. See, e.g., U.S. Pat. No. 4,885,190 at col. 5, 1.44 to col. 6, 1.56.

As shown in FIG. 1, the precreased and prefolded strip 10 is passed around a direction-reversing roller 11 to increase the wrap angle about a heated or cooled roller 12 which functions similar to the heaters or coolers used in the referenced patents to supply the necessary heat or cold to quick-dry lines of adhesive applied by an applicator schematically indicated at 13. The choice of heat or cold depends upon the adhesive selected and is not important to the present invention. The applicator 13, similar to that described in the referenced patents, applies two parallel lines of a suitable adhesive to the edges of the folded tube. The folded tube at this stage, referenced 15, has the same shape as that depicted in FIG. 2 by numeral 20. The outer edges, which are typically sharply creased to form the characteristic shape of such structures as depicted in FIG. 13 of U.S. Pat. No. 4,885,190, are shown folded for simplicity. The free, folded-over edges 21 are each provided with an adhesive line 22 as described.

The continuous strip 10, which was fed into stage 8 from a continuous roll (not shown), is fed by roller 23 to a conventional synchronous shearing device or cutter 25 represented by one rotating drum or cutter 26 carrying a cutting blade 27 and one fixed drum 31. Preferably, the drum 26 is covered with a thin foam layer 27' through which the blade 27 protrudes. The drum 26 rotates at a speed synchronized to the feeding rate of the strip 20. Suitable synchronizing means, shown schematically by block 24, are well known in the art. Whenever the blade 27 rotates to the 6 o'clock position and becomes aligned with the drum 31 below, the blade cutter 27 extending through the compressed foam 27' at the line of contact severs the strip 15 at that line of intersection of the two drums. This cutter thereby forms predetermined lengths of strips 20 from the continuous supply irrespective of the strip feed rate.

In most instances, however, it will be difficult to coordinate the desired strip length with the desired feed rate. A preferred embodiment therefore is to use small rollers 26, 31 which do not cut the strip at each revolution and provide a mechanism to control when the cutting action takes place. This is illustrated in FIG. 1A, which is a side view of the rollers 26, 31 without the processing strip present. In this embodiment, each of the rollers is supported on a respective shaft 80, 81 for rotation. Also, respective gears 82, 83 are connected to the shafts. A bearing 85 mounted on a support member 86 supports the shaft 81. The member 86 is in turn connected to the movable piston 87 of an air cylinder 88. Connected to the air cylinder 88 is a control 90, which may be electronic or electrical.

The arrangement is such that in the non-cutting position, there is a loose or sloppy mesh of the gear teeth of the gears 82 and 83. When the shaft 80 is driven, the shaft 81 rotates at the same speed. This sloppy mesh is achieved by simply lowering the shaft 81 a short distance—as little as five thousandths of an inch is sufficient—so that when the knife edge 27 (FIG. 1) rotates into vertical alignment with the roller 31 below, no contact is made and thus no cutting ensues. To achieve the cutting position, all that is necessary is simply to close up the spacing between the two rollers so that the knife edge does contact the surface of the roller 31 now serving as an anvil to cut any strip passing below. In the illustrated embodiment, this small movement is achieved by activating the air cylinder 88, which moves the piston up and the roller 31 to bring about the cutting action. The sloppy gear mesh allows for the closing up of the space. The block 90 represents any kind of known appropriate control for actuating the air cylinder after a predetermined number of revolutions has taken place, corresponding to the desired length of the strip 20. If desired, the support 86 an be part of a suitable toggle mechanism, which locks the support 86 when moved to its cutting position. This provides a firmer support for the roller 31. To further increase the firmness of the support, the roller 31 can be mounted on a yoke in turn connected to the shaft 81, with the yoke moved up and down between cutting and non-cutting positions.

While in the illustrated embodiment of FIG. 1, the roller 26 is shown above, and the roller 31 below, the reverse arrangement is also possible and may have certain advantages when the strip 15 is oriented with the glue lines at the bottom as shown, namely, it will avoid spreading of the contacted glue lines over the contacted roller surface.

The severed strips 20 are supported in opposed support means 25 having side channels 26 as illustrated in FIG. 2, and are driven forward by drive rollers 28 forming a high-speed, accelerating nip 29. In the arrangement as shown, the spacing of the nip 29 from the cutter 25 is such that the strip 20 enters and is grabbed by the nip 29 just before, just after, or while it is severed by the cutter 25 from the upstream continuous strip 15, that is, substantially at the time of severing. FIG. 3 shows the configuration of the drive rollers 28. The lower roller 28 is divided into split rollers 28-1, 28-2 on a common shaft (not shown) to avoid spoiling the adhesive lines 22. At that point, guided by the side supports 25, the severed strip 20 is accelerated into a straight horizontal stacker 32.

The stacker 32 comprises opposed side supports 33 with guide channels 34, similar to the side supports 25 in FIG. 2. The side supports 33 terminate in an end stop 35. Above the side supports is located a pusher plate 37 connected to a piston 38 which is part of a conventional hydraulic cylinder (not shown). Be low the side supports is a receptacle 40 which has vertical walls spaced apart by the width of the strip 20. The apparatus is timed such that when the severed strip hits the end stop 35, the hydraulic cylinder is energized, the pusher plate 37 pushes down and the folded strip 20 is pushed out of the channel 34 and deposited in superposed relation to the previously processed strips 20. As will be noted in FIG. 4, the severed strips 20 are stacked such that the adhesive lines 22 at the bottom of each folded strip are in contact with the top side of the adjacent folded strip. The further processing of the stacked strips in receptacle 40 is not shown, because it can be carried out in a conventional manner as described in the referenced patents, namely, pressure and heat is applied to the stack in receptacle 40 to activate the adhesive lines and cause the severed strips to adhere to one another to form the desired unitary honeycomb structure.

As will be observed from the following description, the process of using the apparatus of the invention involves a continuous feed of the starting material at stages 8 and 15, followed by severing at stage 25 into predetermined individual strips, which are then accelerated into the stacker 32. This is a key feature of the invention. The object is, to the extent possible, a process operable at a high speed, i.e., a process whose production rate is determined by the feed rate of the original strip 8. If the strip 8 were fed into the stacker 32 at its normal feed rate, the process would not work properly, because the next severed strip would be entering the stacker while the stacker is proceeding to discharge the previous strip. A feature of the invention is that, by accelerating the previous cut strip into the stacker, sufficient time is made available to process that previous strip in the stacker before the next strip is introduced into the stacker. Considered from a broad aspect of the invention, by accelerating a cut strip from a continuous supply during the overall processing, downstream processing of the discrete strips can be consumated before the upstream processing has provided the next cut strip. Preferably, the cut strip accelerator operates at a feed rate that is approximately a factor of two or greater than that of the upstream feed rate. The feed rate differential would depend on the amount of time required in the downstream stacker to discharge the cut strip or at least move the cut strip out of the path of the next cut strip. While in the specific embodiment, the nip grabs the strip 20 substantially at the time of cutting, this is not necessary. There is no restriction as to when the accelerator operates on the severed strip after it has been severed. In other words, assuming the stacker 32 is located further downstream, then the acceleration of the cut strip can occur a substantial time after it has been severed. It will be recognized that side guides for the accelerated strip are necessary to maintain its orientation relative to the stack of strips below it. The side guides 33 maintain that desired orientation. The pusher becomes useful to push the strips downward out of the channel into the stack below. This positive discharge into the stacker receptacle is an alternative to pivoting outwardly the bottom half of the side guides 33 to allow the cut strip 20 to fall by gravity into the receptacle 40 below. Also, the pusher 37 can help maintain the desired horizontal orientation of the strips.

As a further alternative, as illustrated in FIG. 4A, the two side guides 33 with channels 34 can each be replaced by cylinders 41 containing parallel longitudinal slots, or grooves 42, corresponding to the channels, arranged around each cylinder circumference. An indexing device shown schematically at 43 is connected to each cylinder 41. When the cut strip 20 has entered opposed slots 42 on the cylinders, which slots are closed off at their remote end to function as stops, the cylinders 41 are indexed—the right one CCW; the left one CW—with the result that the strip 20 drops through to the holder below, and fresh empty slots are presented to receive the next strip. If an adhesive is used that adheres on contact, then heating to activate will be unnecessary. If desired, the holder can be replaced with a chute that carries the dropped strip 20 to a conveyer 46 that carries the strips 20 downstream where it can be cut if desired and then assembled into the unitary structure. Suitable dimensions for the cylinders 41 would be about 4 inches in diameter with about 8 one-quarter inch wide grooves 42.

The material of the strips and/or the adhesive employed is not critical to the invention. Any of the materials disclosed and any of the adhesives disclosed in the three referenced patents can be used in the process according to this first aspect of the invention. If adhesives are used that remain tacky, the strip handling elements are readily configured to avoid contact with the adhesive lines. See, for example, FIG. 3.

While the synchronized cutter described is preferred, any type of cutter can be employed that will guarantee cut strips of substantially the same length. The synchronized cutter is preferred because the feed rate may fluctuate. But, if suitable control means can be provided, using feed rate sensors and microprocessor control, or suitable sensors provided for accurately measuring the passage of a predetermined length of strip, then the microprocessor can control the activation of a conventional cutter to ensure that strips of substantially the same length are provided to the stacker. It will be evident that other techniques can be devised to accommodate strips that may vary in length, such as by trimming off the ends of the unitary structure. It will also be appreciated that suitable means must be provided to replace the receptacle 40 if used, when filled, with a fresh receptacle, but this is readily accomplished manually or automatically so as not to interrupt the continuous process.

As will be clear from the foregoing description, one of the features is a continuous process in which material is constantly conveyed in the downstream direction of the process. This concept also applies to the description of the embodiments that follow of the second aspect of the invention.

In the description that follows of an embodiment in accordance with the second aspect of the invention, it will be appreciated that when reference is made to an optically transparent material, this is meant to cover a clear material or a translucent material which allows light directly or in diffused form to pass through, or a coarse mesh or other coarse material. Whereas, when the term optically opaque is used, this is meant to include a condition wherein light is normally blocked or diffused such that objects on the outside are not imaged on the window and therefore are not identifiable unless the user knows the structure or its access. Thus, by appropriate choice of material for the third intermediate web, any degree of darkening can be achieved, and thus the invention is not limited to a particular material. The use of a mesh or coarse material for the outer webs will enhance air flow.

In distinction to the earlier embodiments, this embodiment starts with webs or sheets of material instead of strips. The length of the strips in the previous embodiments determines the width of the honeycomb structure produced. In the previous embodiment also, the quantity of stacked strips determines the length of the honeycomb structure, typically the vertical dimension of a conventional window covering, the width being the window width. In the next embodiment, the width of the web or sheet determines the length of the honeycomb structure.

The starting point is a supply from continuous rolls (not shown) of first 50, second 51, and third 52 webs or sheets of material. Suitable adhesive application means 55 are provided, similar to that described in connection with FIG. 1, to provide longitudinal lines of quick-dried or other adhesive 57 to the first and second sheets 50, 51 via a conventional heated or cooled roller 58. The middle or third sheet 52 is fed at an equal rate with sheets 50 and 51 through a conventional slitter 59, which divides the middle sheet into a plurality of longitudinal strips 60 along lines 61 extending parallel to the downstream direction of the webs. See FIG. 8. Instead of applying glue lines to the outer webs, alternatively, glue lines can be applied to opposite sides of the long edges of the strips 60, or at appropriate places to opposite surfaces of the second sheet 52 before it is slitted. As still another alternative, the supply of the strips, instead of being a single sheet subsequently slitted, can be a plurality of spools each supplying one of the strips. FIG. 8 illustrates the subdivision of the web or sheet 52 into discrete strips 60 by slitting along the dotted lines referenced 61. A slitter similar to that employed in U.S. Pat. No. 4,885,190 can be used for this purpose. The slit strips 60 are maintained in their adjacent planar orientation by means of a conveyor belt system referenced 64. If desired, as is known, suitable reduced pressure can be applied to perforated belts of the conveyer system 64 to ensure that the cut strips maintain their original position. The outer webs 50, 51 and the inner subdivided strips 60 are juxtaposed and joined at rollers 70, and then fed through heated rollers 71. The latter function to supply heat and pressure to activate the continuous adhesive lines 57 to cause the outer edges of each of the strips 60 to bond respectively to the upper 50 and lower 51 webs. If non-heat-activated adhesives are used, the roller 71 need not be heated.

FIG. 6 illustrates the arrangement. The adhesive lines 57 are applied continuously in the downstream direction such that each line 57 on the upper sheet 50 faces the left edge (as viewed in FIG. 6) of each strip 60, and each line 57 on the lower sheet 51 faces the right edge of each strip 60. When the so arranged materials pass through the bonder rolls 71, each strip left edge is bonded to the upper sheet, and each strip right edge is bonded to the lower sheet. The resultant assembly, referenced 72, can then be wound up on a roll 73 for further processing.

The process of using the apparatus, as will be noted, is continuous and uninterrupted. The resultant structure wound up on the roll 73 has strips 60 extending lengthwise in the structure. In comparison, the intermediate strips in the rolled up structure depicted in the referenced U.S. Pat. No. 3,384,519 extend transverse to its longitudinal direction. As previously mentioned, in the process according to this second aspect of the invention, the width of the outer sheets (the horizontal dimension in FIG. 6) corresponds to the length of a window covering with horizontal slats. The structure resulting in the process of the invention depicted in FIG. 6 can be used in the same manner as depicted in the U.S. Pat. No. 3,384,519. Assuming that the outer sheets 50, 51 are light transparent, and the strips 60 are light opaque, in the window covering position shown in FIG. 6, when the strips are maintained parallel and substantially in the same plane by pulling the outer sheets in the directions indicated by the arrows, substantially all of the light incident on one of the outer sheets is blocked. For clarity, spaces have been left between adjacent edges of the sheets, but in actual practice the sheet edges would abut or overlap for maximum light blocking. If the outer sheets now are displaced in the opposite direction, as indicated by the arrows in FIG. 7, until the strips 60 extend in spaced parallel planes, as illustrated in FIG. 7, it will be evident that minimum blockage of light incident on one of the outer sheets occurs. Intermediate positions of the outer sheets can thus vary the light transmission between the minimum and maximum values described above. Using outer sheets that are air transparent and inner strips that are air opaque would similarly control air flow between minimum and maximum values. In the embodiment illustrated in FIG. 6, the middle sheet 52 has been slit into six individual strips. It is of course evident that the invention is not limited to this number. The principal restriction of the invention is the overall width of the sheets, which determines the length of a window covering with horizontal slats. But sheets of suitable material of a width length or height are readily obtainable from material suppliers.

As before, any of the materials and adhesives described in the four referenced patents can be employed in accordance with the second aspect of the invention. Moreover, while this aspect of the invention has been described in connection with a light controlling window covering, it is not limited thereto. By a relatively simple modification, more complex honeycomb configurations can be produced by providing more continuous webs and/or more strips, or by varying the location of the strips relative to the webs or relative to each other.

FIG. 9 is a view similar to FIG. 7 of a variant employing three webs and offset strips in different planes. FIG. 9 shows the end product in one intermediate position of the three webs. The webs, referenced 71, 72, and 73 would be fed in a direction extending into the plane of the drawing of FIG. 9, while two intermediate webs would be slit along lines offset by one-half the strip width between each pair of sheets to form strips 74, 75. Adhesive lines 76 would be applied where shown to the strip edges or to the overlying and underlying webs to form bonds between the strip edges and the overlying and underlying webs at the adhesive lines 76 when the assembly of material is juxtaposed and passed through rollers to activate the adhesive lines and apply pressure to form the bonds. The resultant honeycomb structure would possess 4-sided cells extending in the length direction of the webs. It is evident that the structure of FIG. 9 can be enhanced using 4, 5 or more webs to produce more complex cell configurations. The strips at the same level preferably abut rather than overlap to reduce overall thickness. Strips at different levels may or may not overlap.

Figure 10:
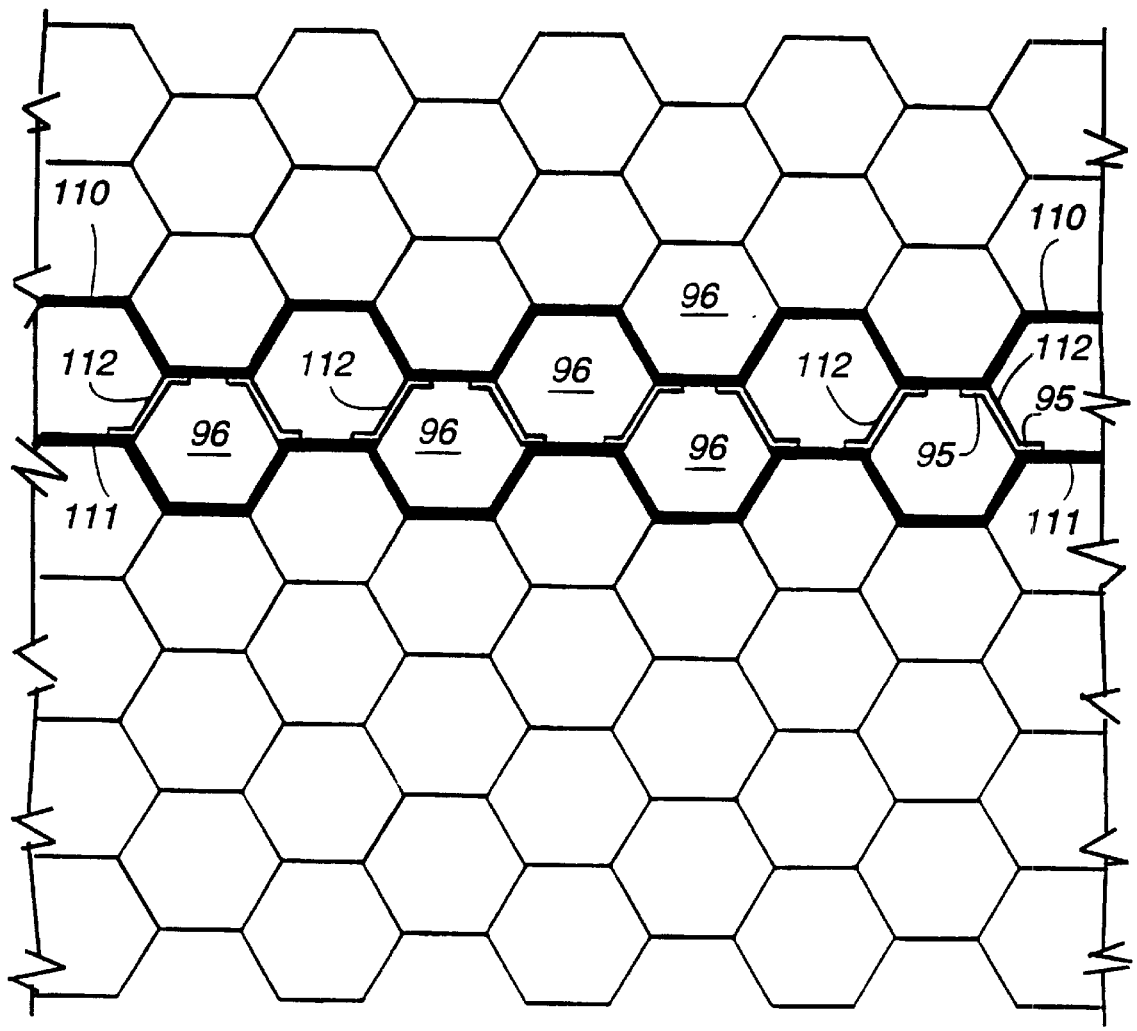
FIG. 10 is a view similar to FIG. 9 showing a further variation.

A structure made by a process similar to that described in connection with the FIG. 9 embodiment will result in a honeycomb containing the conventional 6-sided or hexagonal cells. This is illustrated in FIG. 10 with eight horizontal webs, though it will be understood that less than eight or more than eight webs could be included to vary the height (vertical dimension in FIG. 10) of the honeycomb core. In the case of an 8-webbed structure, each of the webs 100, 110, 111 would be supplied as sheets from rolls as described in connection with the previous embodiments. One row of cells 96 formed between two webs 110, 111 has been amplified to illustrate the bonding. The remaining rows are similarly constructed. The webs 110, 111 illustrated by the thicker lines, are interconnected by a layer of strips 112 bonded to the webs 110, 111 at junctions 95. The total width of each strip layer (if laid flat in a horizontal plane) is substantially equal to one-half the overall width of each sheet plus the small extras at each side to form the bonding junctions 95. Each layer of strips can be slit from a common sheet and spaced apart as indicated, or the strips can each by supplied from its own strip roll. As before, at the conclusion of the bonding, a flat structure results which can be wound up on a roll, or further processed downstream. As will be observed, when the webs 100, 110, 111 of the structure are pulled as illustrated in FIG. 7, the honeycomb structure illustrated in FIG. 10 results. Each 6-side cell 96 has 1 or 3 sides provided by an upper web (dark line—110), 3 or 1 sides provided by a lower web (dark line—111), and 2 sides provided by two adjacent strips (double lines—112) which incline in opposite directions. (The darkened and double lines have only been shown for one row of cells.) The pitch of the strips during processing will thus equal twice the length of a hexagonal side.

Figure 11:
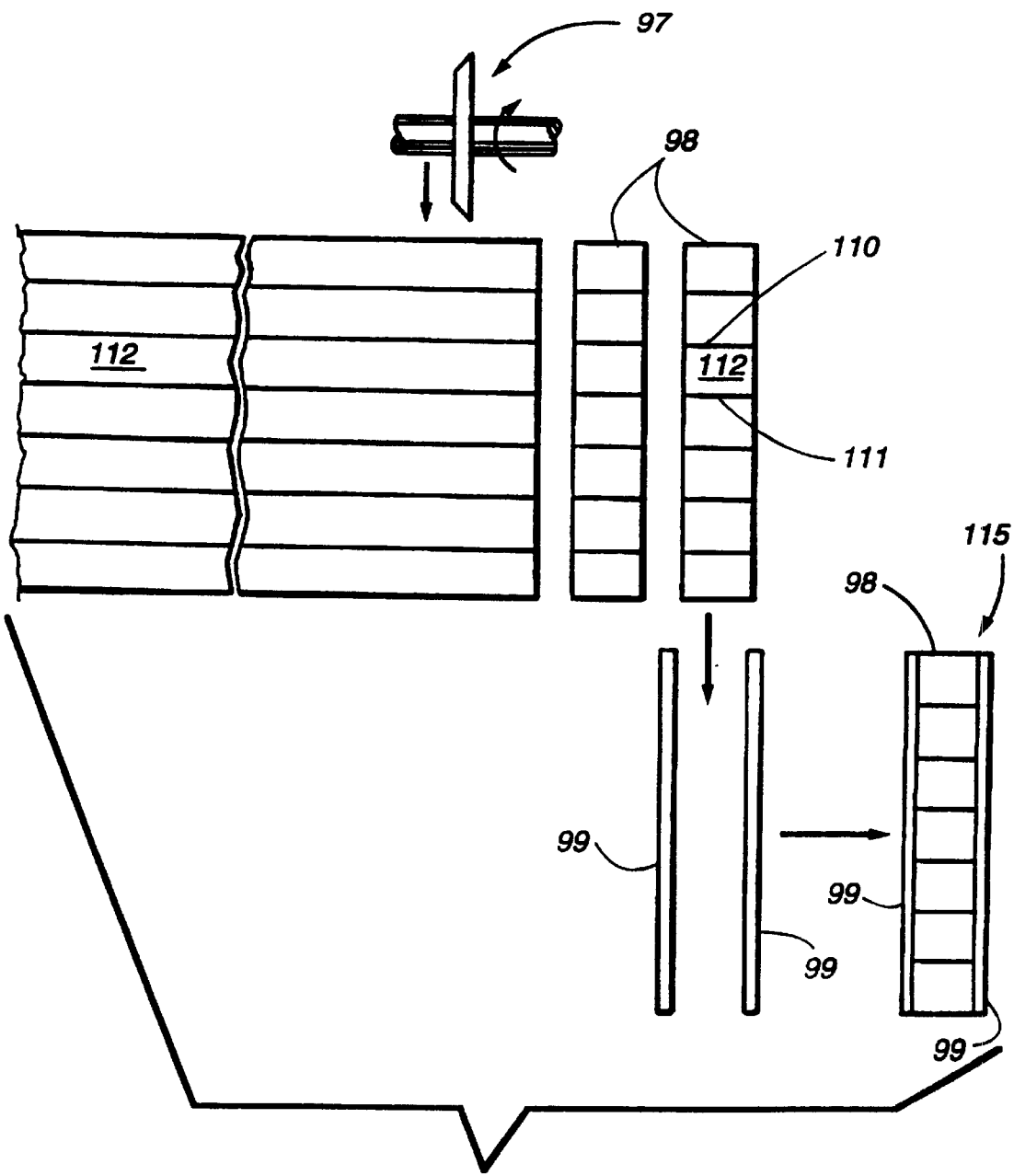
FIG. 11 is a schematic view illustrating processing of the product shown in FIG. 10.

While the resultant honeycomb may find use in several applications, it is preferred to use the honeycomb as shown in FIG. 10 as a core by adhering sheets to the open-ended sides. As one example, illustrated in FIG. 11, the FIG. 10 structure is further processed by slitting (see FIG. 11) with a cutter 97 transverse to its longitudinal dimension (perpendicular to the drawing plane of FIG. 10 and horizontal in FIG. 1) as indicated to form thin core sections 98, on opposite sides of which is bonded or laminated a thin sheet 99 of flexible or semi-rigid or rigid material. The bonding is readily achieved by laying down adhesive on the open cell edges or on the outer sheets 99. If material were chosen for the webs, the strips, and the outer sheets that was substantially air-opaque, then the now-closed honeycomb cells would form many dead air spaces. The structure that thus results, designated 115, could be used as a thermal barrier which is light weight and could be produced very economically. In this application, the honeycomb with the bonded outer sheets would not be expandable. It will thus be seen that the width of the honeycomb core is substantially equal to about two-thirds of the width of the original webs 92, the thickness is determined by the slitting operation with the cutter 97, and the core length would depend upon the number of webs and layers of strips chosen.

Though not shown in FIG. 5, with certain materials it may be desirable to score the strips 60 before they are assembled and adhered to the outer webs 50, 51. The scoring preferably is provided at the strip locations where the strips bend when the finished shade is opened as shown in FIG. 7. Score lines are readily formed in the strips 60 at such fold locations indicated by the arrows 80 in FIG. 7 to assist in defining the strip shape, to simplify folding, or to enhance its appearance. This improvement can also be included for the embodiment of FIG. 9.

It will be understood from the description given that the invention is not limited to webs of the same color. In the second aspect of the invention, the front and back sheets can be of colors different from one another as well as different from the intermediate strips. Moreover, if the strips are supplied from separate spools, even they can be of different colors. Also, the invention is not limited to varying colors, but could also include other attributes of the material, such as texture and degree of transparency or porosity.

The typical sheet material or webs used for such structures are usually stretched in their long direction to improve their strength and reduce stretching during use. In the structures made according to the invention, if hung horizontally, depending upon the width of the window, some stretching may occur. This can be avoided by using blown sheets of material, which have uniform strength properties in all directions. Alternatively, the honeycomb structure can be arranged so that the strips corresponding to the slats in a conventional venetian type blind are hung vertically in the direction in which the material is normally stretched.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A method for fabricating an expandable honeycomb structure, comprising:

feeding at least first, second and third webs in a downstream direction;

applying lines of adhesive to the first, second or third webs;

forming the third web into individual strips before or after the adhesive has been applied;

bringing the first and second webs into juxtaposition and alignment such that a pair of spaced lines of adhesive are aligned with each strip with each line of the pair being exposed to a different side of each strip and with the strips sandwiched between the first and second webs; and applying heat or pressure to cause the adhesive lines to adhere the individual strips to both the first and second webs to form a unitary structure.

2. A method for fabricating an expandable honeycomb structure, comprising:

feeding first, second, and third elongated webs of material in a downstream direction;

applying spaced longitudinally-extending beads of adhesive to the first and second webs;

positioning the third web between the first and second webs and cutting the third web longitudinally into a plurality of side-by-side strips, whereby each strip has two longitudinal side edges extending in the downstream direction and a lateral width; and passing the first and second webs and the side-by-side strips between heated rollers for compressing the materials together while activating the adhesive to bond the strips between the first and second webs.

3. A method for fabricating an expandable honeycomb structure, comprising:

feeding first and second elongated webs of material in a downstream direction;

providing a plurality of side-by-side strips of material in between said first and second webs, wherein each of said strips has
a first longitudinal side edge,
a second longitudinal side edge,
a first face adjacent to said first elongated web, and
a second face adjacent to said second elongated web;

applying elongated beads of an adhesive material to said strips adjacent to said first and second longitudinal side edges of the strips with a first bead on said first face adjacent to said first strip longitudinal side edge and a second bead on said second face adjacent to said second strip longitudinal side edge; and passing the first and second webs with the strips therebetween between a pair of rollers to bond the strips to the first and second webs.

4. The method of claim 3, further including the step of providing said strips of material in independent rolls.

5. The method of claim 3, wherein said strips of material are supported by a belt conveyor in between said first and second webs.

6. The method of claim 3, wherein said strips are opaque and said webs are transparent.

7. The method of claim 3, wherein said rollers are heated.

8. A method for fabricating an expandable honeycomb structure, the method comprising feeding at least first, second, and third webs in a same downstream direction;

forming the third web into individual strips;

bringing the first and second webs into juxtaposition and alignment with said strips being positioned between said first and second webs; and securing said strips to said first and second webs such that one side of said strips is secured to the first web and a second side of said strips is secured to the second web.

9. The method of claim 8, wherein said strips are secured to said first and second webs by bonding.

10. The method of claim 9, wherein said strips are secured to said first and second webs with adhesive.

11. A method for fabricating an expandable honeycomb structure, comprising:

feeding first, second, and third elongated webs of material in a downstream direction;

applying spaced longitudinally-extending beads of adhesive to the first and second webs;

positioning the third web between the first and second webs, and cutting the third web longitudinally into a plurality of side-by-side strips, whereby each strip has a lateral width and two longitudinal side edges; and passing the first and second webs and the side-by-side strips between heated rollers for compressing the materials together while activating the adhesive to bond the strips between the first and second webs, wherein the beads of adhesive applied to the first and second webs are spaced from each other a distance approximately equal to the width of said strips, and the beads on the first web are positioned approximately mid-way between the beads on the second web, and the beads are engaged with opposite faces of the strips at locations adjacent to the side edges of the strips.

12. The method of claim 11, wherein said first and second webs are transparent and said third web is opaque.

13. A method for fabricating an expandable honeycomb structure, the method comprising feeding a first material in downstream direction;

feeding a second material the downstream direction;

feeding a third material in the downstream direction between said first and second materials;

applying extruded polyester strips to said first, second, or third materials;

forming said third material into individual elongated strips either before or after applying said extruded polyester strips, said individual elongated strips extending in the downstream direction;

bringing the first and second materials into juxtaposition and alignment such that a pair of spaced lines of extruded polyester strips are aligned with each individual elongated strip of said third material, with each line of the pair being exposed to a different face of each individual elongated strip, and with the individual elongated strips sandwiched between the first and second materials; and applying at least one of heat and pressure to cause said extruded polyester strips to attach the individual elongated strips to both the first and second materials to form a unitary structure.

14. The method of claim 13, wherein said first and second materials are transparent and said third material is opaque.

15. The method of claim 13, wherein said forming step comprises cutting said third material into said individual elongated strips extending in the downstream direction.

16. The method of claim 13, wherein said individual elongated strips of material are supported by a belt conveyor in between said first and second materials.

17. The method of claim 13, wherein said individual elongated strips are opaque and said first and second materials are transparent.

* * * * *